UNITED STATES PATENT OFFICE.

NATHAN McCOY, OF MANCHESTER, NEW HAMPSHIRE.

COMPOSITION FOR ROOFING, &c.

SPECIFICATION forming part of Letters Patent No. 275,507, dated April 10, 1883.

Application filed January 6, 1883. (No specimens.)

To all whom it may concern:

Be it known that I, NATHAN McCOY, a citizen of the United States, residing at Manchester, in the county of Hillsborough, in the State of New Hampshire, have invented an Improved Composition for Roofing and like purposes, of which the following is a specification.

My invention relates to a composition used for roofing and for plastering or covering the walls and ceilings upon the exterior or interior of buildings, and is an improvement upon the patent granted to Lucius S. Stinson, of date August 3, 1869, for a new composition of matter for roofing and other purposes.

The improvement consists in substituting for petroleum-oil what are commonly known as "waste oils," or such oils as cannot be used in the arts for distillation or for illuminating purposes, and adding to the composition plumbago, litharge, and copperas or blue vitriol, so that the composition shall consist of pulverized or powdered soapstone, waste or residuum oils and resin in about the same proportions as in said Letters Patent set forth—viz., sixty-seven per cent. of soapstone, twenty-two per cent. of resin, and eleven per cent. of waste oils, with the addition of about one-eighth part of plumbago, litharge, and copperas each.

I have found that the class of oils commonly known as "waste oils," which are oils of the lowest grade, on account of the same being too thick and tar-like, and for the use of which no place in the arts hitherto has been found, can be used to great advantage in the above composition in the place of petrolum, and the composition does not need so much soapstone. The composition having waste oil also, instead of petroleum, can be laid on with a brush as well as with trowel when a thin coating only is required, as in case of imperfect shingle or tin roofs.

By the addition of plumbago, which is not only fire-proof, but is soft and lubricating in its nature, and litharge, and copperas, the composition not only will withstand all conditions of the atmosphere, heat and cold, and is so adhesive in its nature that it can be applied to roofs of any angle or pitch, or lathing, whether of wood or metal, but also has the essential quality of being fire-proof. Copperas tends to harden the composition, so it can be made of any degree of hardness.

I prepare the composition substantially as described in said Letters Patent—viz., I take the oil and the resin and place the same in a suitable kettle, each in about the said proportions, and heat the same to about 197° Faherenheit, and then add thereto, while at this temperature, about the said proportions of powered soapstone, plumbago, litharge and copperas, and stir and mix the mass thoroughly with any suitable implement until the whole mass is reduced to the consistency of mortar. It can be made stiff or light, as its use may require.

This composition, when thus prepared and still hot or warm, can be laid on roofs of any angle or pitch by a trowel or brush, and rolled and smoothed by any of the well-known implements for smoothing building-cements; or, the composition can be laid on the perpendicular sides of buildings, or on lathings composed of wood or metal, as wire laths or wire screens.

This improved composition forms a cement which when applied to buildings is not affected by any condition of the atmosphere or by fire.

What I claim as my invention, and desire to secure by Letters Patent, is—

A composition for roofing, consisting of about sixty-seven parts of soapstone, twenty-two parts of resin, eleven parts of waste or residuum oil, and one-eighth part each of plumbago, litharge, and copperas, substantially as shown, and for the purposes described.

NATHAN McCOY. [L. S.]

Witnesses:
JOHN J. PICKMAN,
H. H. BROWNE.